Figure 1:
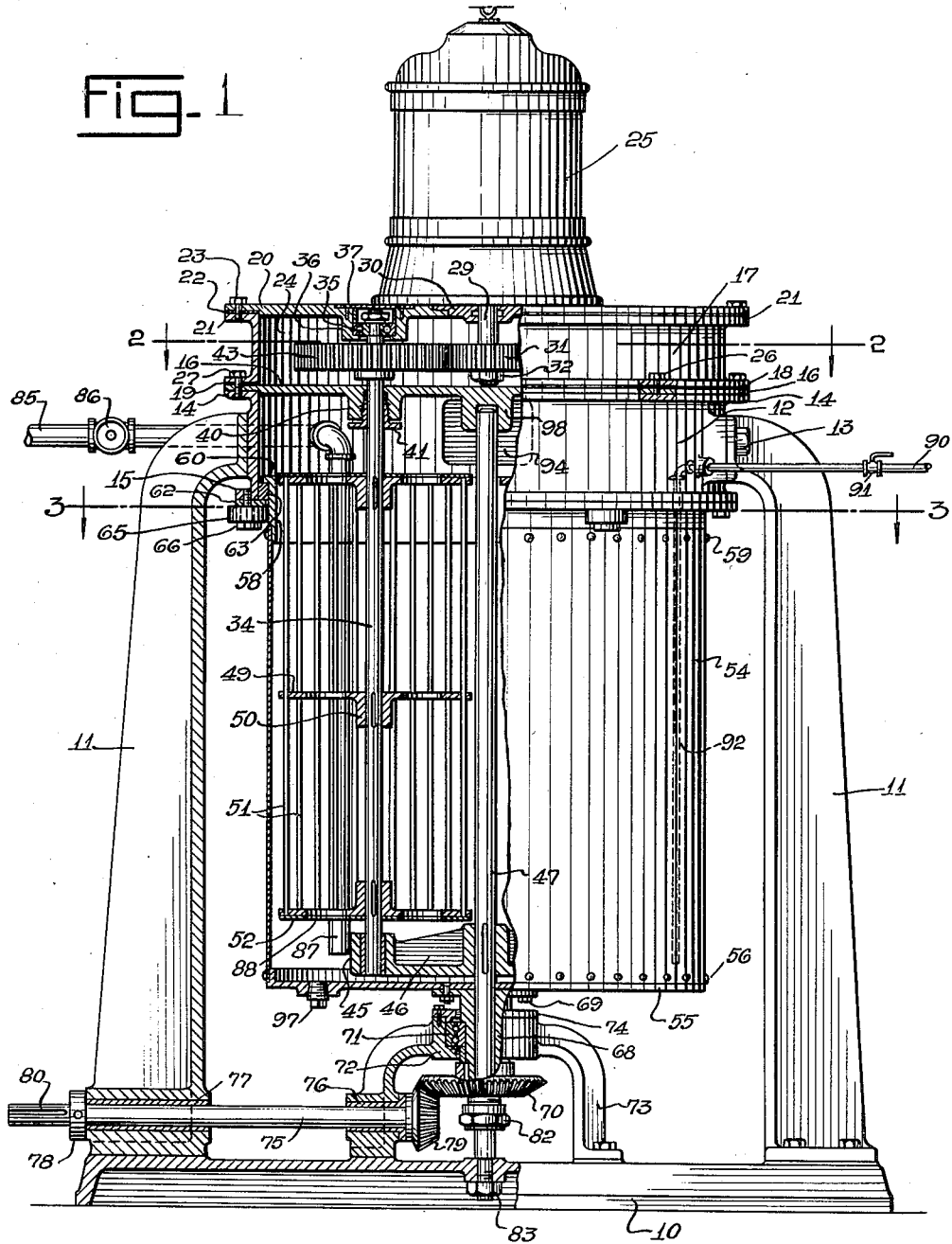

Oct. 10, 1933.   B. T. BALLARD   1,929,470
FOAM CELL
Filed May 23, 1931   2 Sheets-Sheet 1

INVENTOR
BERNARD T. BALLARD.
BY
ATTORNEY

Oct. 10, 1933.   B. T. BALLARD   1,929,470
FOAM CELL
Filed May 23, 1931   2 Sheets-Sheet 2
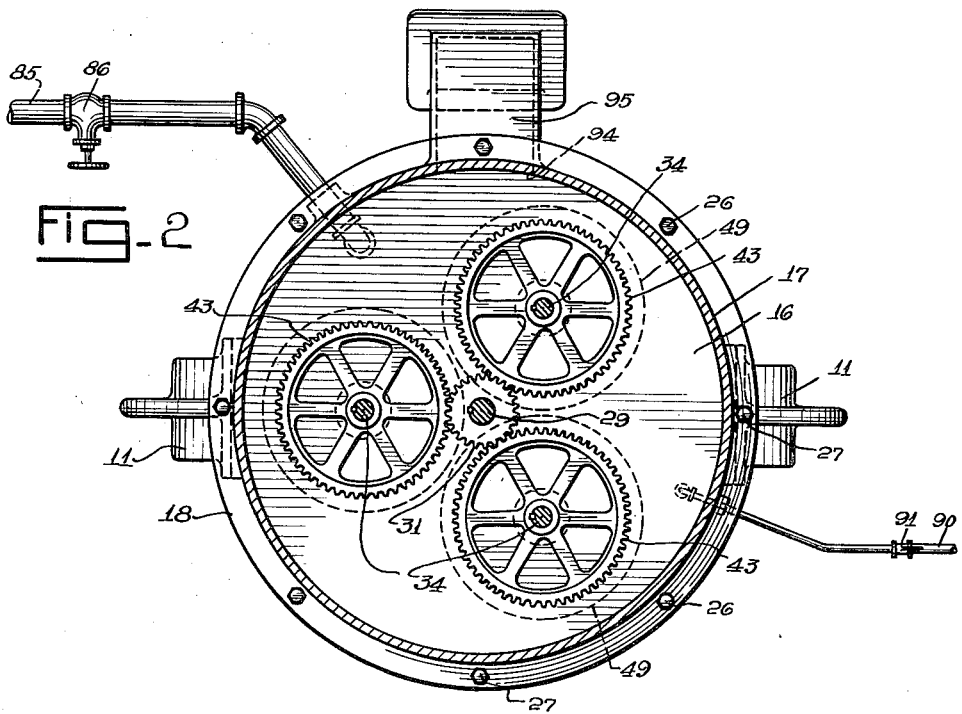
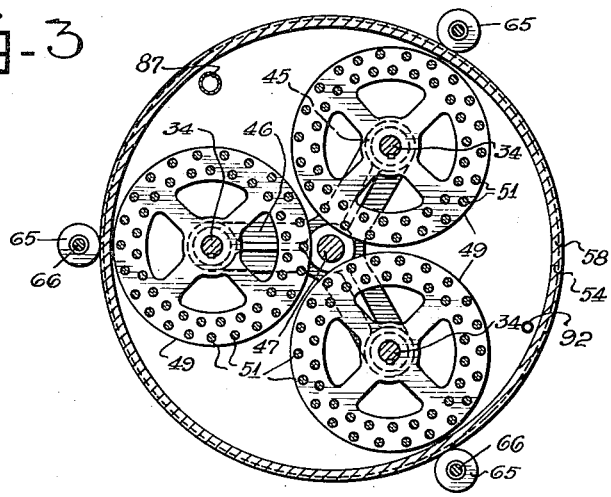
INVENTOR
BERNARD T. BALLARD.
BY
ATTORNEY Patented Oct. 10, 1933

1,929,470

UNITED STATES PATENT OFFICE 1,929,470

FOAM CELL

Bernard T. Ballard, Lombard, Ill., assignor to United States Gypsum Company, Chicago, Ill., a corporation of Illinois Application May 23, 1931. Serial No. 539,538

6 Claims. (Cl. 261—93)

This invention relates to mixing devices, and has reference more particularly to foam cells suitable for producing the foam used in light weight material.

In the manufacture of light weight materials, such as cementitious products, including gypsum, Portland cement, or the like as a base material, as well as for making light weight organic material, such as rubber, insulating materials and the like, it is customary to prepare a foam of stable characteristics and then mix the foam with the other ingredients in the composition. The foam solution to be whipped into foam, is usually made up in advance and contains such foaming agents as soap bark, licorice root extract, rosin soap, casein, etc. The present invention is directed more particularly to the apparatus used in whipping the foam solution into foam.

Foam cells have been proposed which are difficult to disassemble for cleaning and repairing. Some of the foam cells in the prior art are not as efficient as desired in preparing the foam, so that a foam of sufficiently low density is not produced.

An object of this invention, therefore, is to provide a foam cell suitable for whipping foam solution into foam.

Another object of the invention is to provide a foam cell in which the beater elements are so arranged as to give a maximum of whipping efficiency.

A further object of the invention is to provide a foam cell which can be easily disassembled for cleaning and repairing; also to improve mixing apparatus in other respects hereinafter specified and claimed.

Reference is to be had to the accompanying drawings, forming a part of this specification, in which Fig. 1 is a sectional elevation of my improved foam cell with parts broken away to disclose the construction, Fig. 2 is a sectional view through the foam cell taken on line 2—2 of Fig. 1, and Fig. 3 is a transverse sectional view through the foam cell taken on line 3—3 of Fig. 1, The foam cell is preferably composed of a base 10, carrying a pair of vertical standards 11 molded or otherwise secured thereto. An annular ring or casting 12 is secured to the upper end of standard 11 by means of bolt 13, and is provided with upper and lower, outstanding annular flanges 14 and 15 respectively. A cast, annular plate or partition 16 is machined to fit closely on top of the flange 14 and an annular ring or cylinder 17 has an outstanding annular flange 18 which is supported by the periphery of the plate 16, a gasket 19 being interposed between the flange 18 and the plate 16. A cast cover plate 20 is supported by an annular flange 21 formed around the upper periphery of the ring 17, an annular gasket 22 being interposed between said ring and the flange 21. Cap bolt 23 extends through the cover plate 20 and gasket 22, engaging the flange 21 so as to form an oil tight chamber or cage 24. A motor 25 is supported centrally on the annular plate 20 for driving the whipping mechanism to be more fully described. Cap bolt 26 extends through the flange 18 and gasket 19, being threaded into the plate 16 so as to connect the plate 16 to the annular ring 17. Cap bolts 27 pass through the flange 18, gasket 19, ring 16 and are threaded into the flange 14 so as to detachably connect the gearcase 24 to the annular ring 12. By removing the cap bolts 27, the gear case 24 and motor 25, the internal whipping mechanism can be removed from the ring 12 for cleaning and repair.

A shaft 29 extends downwardly from the motor 25, through a seal plate 30 seated in an annular opening formed in the cover plate 20, and a spur pinion 31 is secured to the lower end of the shaft 29 by means of a nut 32. All of the shafts 34 (Fig. 2) are rotatably mounted at their upper end in ball or roller bearings 35 which are mounted in suitable bearing flanges 36 formed in the cover plate 20, the upper ends of said shafts being covered by a cover plate 37 secured to the plate 20 by screws or other suitable means, so as to insure that no oil will leak out through the cover plate 20 from the gear case 24. Each of the shafts 34 extends downwardly through a stuffing box flange 40 formed on the plate 16, and a gland 41 is provided in the stuffing box flange 40 for preventing the downward leakage of oil from the case 24, past the shafts 34. A spur gear 43 is connected near the upper end of each shaft 34 and meshes with the spur pinion 31, so that rotation of the motor shaft 29 causes the rotation of shafts 34.

The lower ends of each of the shafts 34 are received in bearings 45 which are carried upon bracket 46, the latter being rigidly secured and keyed to a stationary vertical shaft 47. When three shafts 34 are used as shown in Figs. 2 and 3, the bracket 46 will have three arms, each of them having a bearing 45 on the outer end thereof. A plurality of beater-rod-supporting plates 49 are provided with central spider brackets 50 which are keyed or otherwise rigidly secured in spaced parallel relation upon each of the shafts 34. Beater rods 51 extend through each of the plates 49 and are arranged in a plurality of annular series, these series being preferably two in number as seen in Fig. 3. Annular plates 52 are secured to the outside surfaces of the upper and lower plates 49 so as to prevent displacement of the rods 51 when the apparatus is in operation.

A cylinder or container 54 encloses the beater elements and is provided with a bottom plate 55, secured to the cylinder 54 as by rivet 56. The cylinder 54 can be rigidly secured to the annular ring 12, but in the preferred form of the apparatus the container 54 is mounted for rotation so that no dead areas are formed between the beater elements, and a more thorough whipping of the solution into foam is obtained. In the form of device shown in Fig. 1, in which the cylinder 54 is mounted for rotation, the upper end of the cylinder 54 is rigidly secured to an annular ring 58 as by rivets 59. An outstanding annular flange 60 is formed around the upper edge of the ring 58 and is loosely fitted inside of the ring 12 for free rotating movement. An annular ring 62 is connected to the flange 15 and an annular ring of packing 63 is provided between the ring 62 and the flange 60 so as to prevent leakage of foam out of the foam cell. A plurality of rollers 65 are arranged to contact with the outer surface of the ring 58 so as to maintain the ring 58 concentric with the ring 12 at all times. These rollers are mounted to roll on headed bolts 66 which pass through the ring 62 and are threaded into the flange 15.

Sleeve 68 is bolted to the bottom of plate 55 concentric therewith by means of bolts 69 and a beveled gear 70 is keyed to said sleeve 68 near the lower end thereof. The sleeve 68 rotates freely on the stationary shaft 47 and is rotatably mounted in a roller or ball bearing 71 which is supported in a bearing bracket 72. The bracket 72 is provided with downwardly extending legs 73 which are bolted to the base 10. A cap 74 is bolted to the top of the bearing bracket 72 in order to retain the bearing 71 in place. A shaft 75 is rotatably mounted in a bearing 76 formed in one of the legs 73, and is also rotatably mounted in a bearing 77 which is formed in one of the standards 11. End play of the shaft 75 is prevented on one side by a collar 78 and at the other end of the shaft by means of a bevel pinion 79, the latter meshing with the bevel gear 70. The outer end of shaft 75 is provided with a key 80 for attaching a pulley, sprocket wheel or any other means of causing the rotation of the shaft 75 by any suitable source of power, such as an electric motor. The rotation of the shaft 75 thus causes the rotation of the cylinder 54 about the stationary shaft 47. A stuffing box 82 is screwed on to the lower end of the sleeve 68 to prevent leakage of foam solution out of the lower end of said sleeve, and the lower end of the shaft 47 passes through the base 10 and is threaded so as to be securely fixed in place by means of a nut 83.

The foam solution to be whipped into foam, is introduced into the apparatus by a pipe 85 which is connected to the annular ring 12 and is provided with a hand valve 86. The pipe 85 has an arm 87 which extends downwardly to a point near the bottom of the cylinder 54 and positioned between two of the rotating elements. The foam solution is thus caused to flow upwardly in contact with the beater elements, passing through openings 88 formed in the plates 49 and 52. Compressed air is introduced into the apparatus through a pipe 90 which is also connected to the annular ring 12 and is provided with a hand control valve 91. The pipe 90 has a leg 92 which extends downwardly into the cylinder 54 to a point near the bottom thereof. The compressed air is thus mixed with the foam solution by the rapidly rotating beater elements and beater rods 51 to produce a foam which has an ever-decreasing density as it moves toward the upper part of the cylinder 54 and finally flows out through an opening 94 formed in the ring 12 and through a duct 95 connected to the ring 12 adjacent said opening 94. A drain plug 97 is provided in the bottom plate 55 so that the apparatus may be cleaned when desired by flushing out with water. In order to permit easy removal of the working parts of the apparatus, the upper end of the stationary shaft 47 is loosely received in a bearing 98 formed on the lower face of the plate 16 and at the center thereof. The gear case 24 being oil tight, the gears contained therein can run in oil at all times, thus insuring quiet operation of the apparatus.

In operation, the foam solution flows into the cylinder 54 through pipe 85 and 87 and compressed air is admitted to the bottom of the cylinder 54 through pipe 90 and 92. The three beater shafts 34 rotate in their bearings 35, 40, and 45, rotating the beater rods 51 at a high rate of speed so as to whip the compressed air and foam solution together so as to form the foam which flows out through opening 94 and duct 95 to the point of discharge. A common use for the foam is mixed with calcined gypsum and water to form the core of plasterboard and also for forming building block. The motor 25 rotates the spur pinion 31 which in turn rotates the gears 43 and shafts 34. The stationary shaft 47 supports the stationary bearing bracket 46 and also passes loosely down through sleeve 68 which is secured to the bottom plate 55. The sleeve 68 is rotatably supported in bearing 71 and is provided at the lower end with a stuffing box 82 around the shaft 47 and near its lower end is also provided the bevel gear 70 meshing with bevel pinion 79, the latter being mounted upon driven shaft 75, so as to cause the rotation of cylinder 54. The annular gasket 62 prevents leakage of foam past the flange 60 and ring 12, and rollers 65 maintain the upper end of cylinder 54, centrally located, as it rotates. When it is desired to clean or repair the apparatus about four of the cap bolts 27 are removed. A mechanical hoist is applied to the upper end of the motor 25 and the entire gear case 24, shafts 34 and beater rods 51 are withdrawn from the bearings 45 and cylinder 54.

I would state in conclusion that while the illustrated example constitutes a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. In a foam cell, a cylindrical container arranged with the axis thereof substantially vertical, a plurality of beater shafts rotatably mounted within said container, and arranged in a circle concentric therewith, beater elements supported by said shafts, means for rotating each of said shafts, means for rotating said container, means for introducing fluids into said container to be formed into foam by said beater elements, and means for discharging said foam from said container.

2. In a foam cell, a cylindrical container arranged with its axis substantially vertical, said container being divided into a stationary section and a rotary section, means for rotating said rotary section, means for introducing foam solution and compressed air through the walls of said stationary section to a point adjacent the bottom of said rotary section, beater elements rotatably mounted within said container and adapted to form said foam solution and compressed air into foam, and means for discharging said foam from said container.

3. In a foam cell, a cylindrical container, a driven pinion associated with said container, a plurality of gears meshing with said pinion, a beater shaft driven by each of said gears, beater elements on each of said shafts, means for introducing foam producing material into said container, means for discharging the foam from said container, and power means for rotating a portion of said container.

4. In a foam cell, a cylindrical container, a plurality of rotatably mounted shafts arranged in a concentric circle within said container, means for rotating each of said shafts, beater elements mounted upon each of said shafts, means for introducing a liquid and compressed air into said foam cell, means for discharging foam from said cell, and power means for rotating a portion of said container as said shafts rotate.

5. In a foam cell, a cylindrical container having its axis substantially vertical, a plurality of beater shafts rotatably and removably positioned within said container, said shafts being arranged in a circle concentric with said container, a motor, driving means between said motor and said shafts for causing the rotation of said shafts, beater elements mounted upon each of said shafts, means for removing said motor, shafts and beater elements as a unit from said container for cleaning and repairing, means for introducing fluids into said container to be formed into foam by said beater elements, means for discharging foam from said container, and power means for rotating said container.

6. In a foam cell, a cylindrical container, a driven pinion associated with said container, a plurality of gears meshing with said pinion, a beater shaft driven by each of said gears, a plurality of spaced discs secured to each of said shafts, an annular series of beater rods supported by said plates concentric with each of said shafts, means for introducing foam solution and compressed air adjacent the bottom of said container, and means for discharging foam from the top of said container.

BERNARD T. BALLARD.